(12) United States Patent
Nachbargauer

(10) Patent No.: US 10,245,670 B2
(45) Date of Patent: Apr. 2, 2019

(54) WELDING OR CUTTING TOOL

(71) Applicant: IHT Automation GmbH & Co. KG, Baden-Baden (DE)

(72) Inventor: Kurt Nachbargauer, Baden-Baden (DE)

(73) Assignee: IHT Automation GmbH & Co. KG, Baden-Baden (DE)

( * ) Notice: Subject to any disclaimer, the term of this patent is extended or adjusted under 35 U.S.C. 154(b) by 329 days.

(21) Appl. No.: 15/308,436

(22) PCT Filed: Mar. 2, 2015

(86) PCT No.: PCT/EP2015/054281
§ 371 (c)(1),
(2) Date: Nov. 2, 2016

(87) PCT Pub. No.: WO2015/197204
PCT Pub. Date: Dec. 30, 2015

(65) Prior Publication Data
US 2017/0050252 A1    Feb. 23, 2017

(30) Foreign Application Priority Data
Jun. 26, 2014 (DE) .................. 10 2014 009 308

(51) Int. Cl.
*B23K 7/00* (2006.01)
*B23K 5/00* (2006.01)
(Continued)

(52) U.S. Cl.
CPC .............. *B23K 7/102* (2013.01); *B23K 5/22* (2013.01); *B28B 1/24* (2013.01)

(58) Field of Classification Search
CPC ............. H05H 1/34; H05H 2001/3473; H05H 2001/3436; H05H 2001/3442; H05H 2001/3457; B23K 10/00
See application file for complete search history.

(56) References Cited

U.S. PATENT DOCUMENTS

| | | | | |
|---|---|---|---|---|
| 4,590,354 A | * | 5/1986 | Marhic | H05H 1/34 219/121.48 |
| 4,767,908 A | * | 8/1988 | Dallavalle | H05H 1/34 219/121.5 |

(Continued)

FOREIGN PATENT DOCUMENTS

| | | |
|---|---|---|
| DE | 27 797 A | 3/1964 |
| DE | 102 02 867 A1 | 8/2003 |

(Continued)

OTHER PUBLICATIONS

International Search Report of PCT/EP2015/054281, dated Jul. 14, 2015.
(Continued)

*Primary Examiner* — Erin B Saad
(74) *Attorney, Agent, or Firm* — Collard & Roe, P.C.

(57) ABSTRACT

A welding or cutting tool for welding or cutting electrically conductive workpieces includes a nozzle arranged on a tool tip for discharging a welding or cutting beam and a nozzle cap which at least partly surrounds the nozzle, is open towards the tool tip, and has an electrode that forms a capacitance with the respective workpiece and an insulating element that electrically insulates the electrode from the other components of the tool. The electrode consists of a first electrically conductive ceramic material and is formed integrally with the insulating element, which consists of a second electrically insulating ceramic material.

14 Claims, 2 Drawing Sheets

Figure 1:
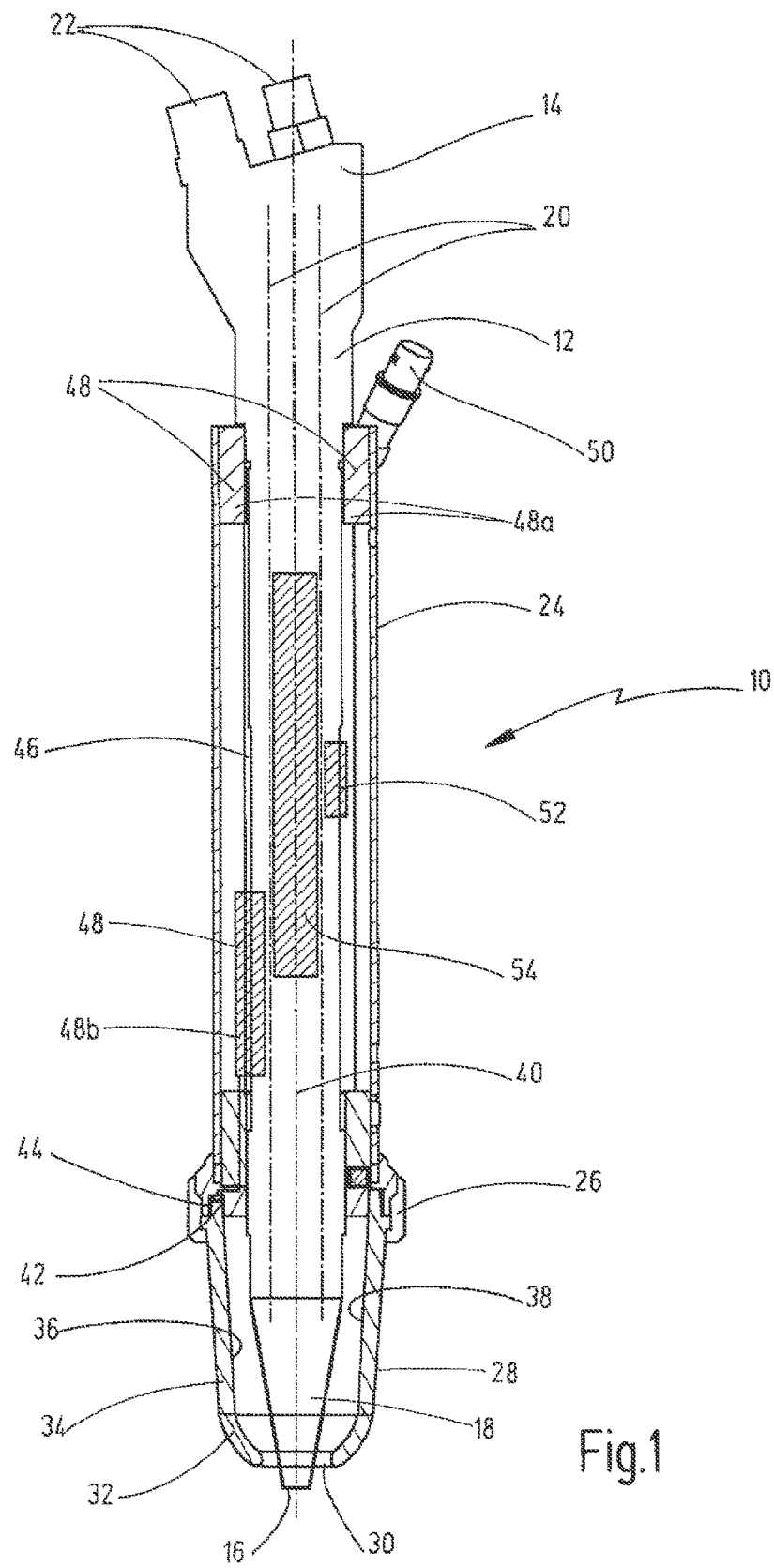

(51) Int. Cl.
*B23K 7/10* (2006.01)
*B23K 5/22* (2006.01)
*B28B 1/24* (2006.01)

(56) References Cited

U.S. PATENT DOCUMENTS

| | | | | | |
|---|---|---|---|---|---|
| 5,233,154 | A | * | 8/1993 | Horiai | H05H 1/34 219/121.48 |
| 5,278,388 | A | * | 1/1994 | Huang | B23K 10/00 219/121.45 |
| 5,304,770 | A | * | 4/1994 | Takabayashi | H05H 1/34 219/121.48 |
| 5,409,164 | A | * | 4/1995 | Delzenne | H05H 1/34 239/132.3 |
| 5,500,504 | A | * | 3/1996 | Jagiella | B23K 26/04 219/121.67 |
| 5,628,924 | A | * | 5/1997 | Yoshimitsu | H05H 1/34 219/119 |
| 6,207,923 | B1 | * | 3/2001 | Lindsay | H05H 1/34 219/121.48 |
| 8,188,403 | B2 | | 5/2012 | Speker | |

FOREIGN PATENT DOCUMENTS

| | | |
|---|---|---|
| DE | 10 2009 014 947 A1 | 10/2010 |
| DE | 10 2009 039 857 A1 | 3/2011 |
| WO | 2007/060008 A1 | 5/2007 |

OTHER PUBLICATIONS

German Search Report in DE 10 2014 009 308.5 dated Jul. 23, 2014 with an English translation of relevant parts.

* cited by examiner

WELDING OR CUTTING TOOL

CROSS REFERENCE TO RELATED APPLICATIONS

This application is the National Stage of PCT/E22015/054281 filed on Mar. 2, 2015, which claims priority under 35 U.S.C. § 119 of German Application No. 10 2014 009 308.5 filed on Jun. 26, 2014, the disclosures of which are incorporated by reference. The international application under POT article 21 (2) was not Published in English.

The invention relates to a welding or cutting tool in accordance with the preamble of claim 1.

A tool of the type stated initially, configured as a cutting torch, is known from DE 10 2009 039 857 A1. This previously known cutting torch has a nozzle cap that has a metal cap forming an electrode, as well as an insulating ring composed of ceramic and connected with the metal cap. The insulating ring insulates the metal cap from the other components of the cutting torch, so that the metal cap forms a measurable capacitance with an electrically conductive work piece to be worked on, which capacitance is dependent on the reciprocal distance. To determine the distance of the torch tip from the work piece, the capacitance or a characteristic variable that characterizes the capacitance is measured at regular time intervals, and the distance of the metal cap from the work piece is calculated from the values obtained. The distance of the torch tip from the work piece can then be calculated from this distance. This distance measurement has already proven itself excellently in practice. However, it is complicated and therefore expensive to fit the metal electrode into the ceramic material of the insulating ring.

It is therefore the task of the invention to further develop a welding or cutting tool of the type stated initially, in such a manner that it can be produced more advantageously.

This task is accomplished, according to the invention, by a welding or cutting tool having the characteristics of claim 1. Advantageous further developments of the invention are the object of the dependent claims.

The invention is based on the idea that an electrically conductive ceramic material can be connected with an electrically non-conductive ceramic material more easily than a metal piece. Such a connection can be implemented very well in a two-component ceramic injection-molding method, wherein the raw material for the first ceramic material, which forms the electrode, is introduced into an injection mold in a first method step, and the raw material for the second ceramic material, which forms the insulating element, is introduced into the injection mold in a second method step. The one-piece semi-finished product obtained in this manner is then removed from the injection mold and fired in a firing process to form the finished nozzle cap. However, it is also possible that the raw material for the ceramic material that forms the electrode is introduced into a first injection mold, and the raw material for the second ceramic material, which forms the insulating element, is introduced into a second injection mold, and that the semi-finished products obtained in this manner (semi-finished electrode and semi-finished insulating element) are removed from the injection molds and joined together in a common firing process. In this regard, titanium nitride or a ceramic having titanium nitride is particularly possible for the first, electrically conductive ceramic material. For example, it was found in studies that a ceramic that consists of titanium nitride and aluminum oxide becomes metallically conductive when the proportion of the titanium nitride amounts to at least 18 vol.-%. The conductivity also increases with an increasing proportion of titanium nitride. The second, electrically insulating ceramic material is preferably aluminum oxide.

It is practical if the nozzle cap has a contact element that connects the electrode with an electrical connector of evaluation electronics, in electrically conductive manner. The contact element can consist of metal. However, it is preferred that it consists of the first ceramic material and, in this regard, can be configured in one piece with the electrode and the insulating element. In this regard, it is particularly possible, for production of the contact element, that in a further method step, the raw material for the first ceramic material that forms the contact element is introduced into the injection mold or into the injection mold for the insulating element before removal of the semi-finished product from the injection mold. It is advantageous if the contact element is configured as a film strip having a thickness of maximally 0.2 mm, preferably of maximally 0.1 mm, in other words a thickness that corresponds to the thickness of a sheet of paper. Such a film can be drawn from ceramic material and then cut into strips. It is practical if the contact element is embedded into the insulating element.

It is advantageous if the contact element extends over a step on the insulating element that runs transverse to a longitudinal axis of the tool, and there contacts the connector of the evaluation electronics. Particularly if the contact element is embedded into the insulating element, it can advantageously project from the insulating element at the step, and there can be bent to produce planar contact with the step. On a step, which runs transverse to the longitudinal axis of the tool, the contact is protected against slag particles that splash up, prevent contacting with the connector of the evaluation electronics if they are deposited on the contact element, and can make the electrode unusable.

According to an alternative embodiment, the contact element is disposed on an inner surface of the insulating element that faces the nozzle. This simplifies affixation of the contact element to the insulating element. The electrode furthermore preferably has an outer surface, facing away from the nozzle, in the shape of a spherical calotte having an exit opening disposed in the center. In this regard, it is particularly preferred that the electrode has the shape of a segment of a spherical shell having an exit opening disposed in the center. It has been shown that this geometry of the electrode is particularly advantageous, because slight tilting of the longitudinal axis of the work piece relative to the surface of the work piece has only a slight effect on the measurement result.

The invention primarily relates to welding or cutting torches. However, a tool according to the invention can also be a laser, plasma or water-jet cutting device.

In the following, the invention will be explained using an exemplary embodiment shown schematically in the drawing. The figures show:

FIG. 1 a cutting torch in longitudinal section, and

Figure 2:
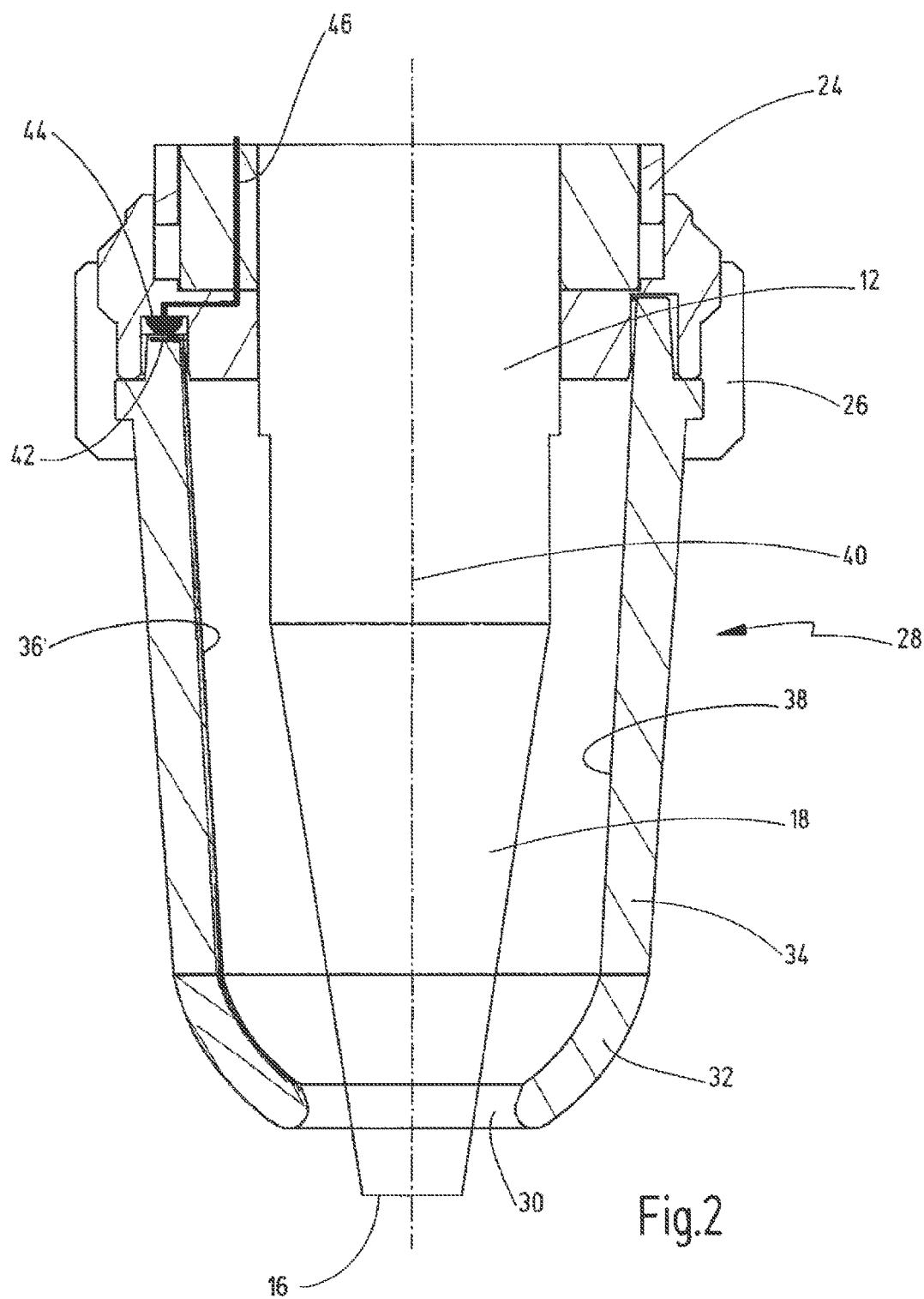

FIG. 2 an enlarged representation of the front region of the cutting torch according to FIG. 1, which region has the torch tip, in longitudinal section.

The cutting torch 10 shown in FIG. 1 has a torch body 12 that extends, in a longitudinal direction, from a connector part 14 all the way to a torch nozzle 18 that forms the torch tip 16, which nozzle is attached to the body. The torch body 12 has gas feed lines 20 that extend, in the longitudinal direction, from the connector part 14 to the torch nozzle 18, indicated only with broken lines in FIG. 1, and can be connected with a gas supply device by way of connector flanges 22. A mantle tube 24 composed of metal is pushed onto the torch body 12, which tube encloses the body all around over a major portion of its length, and ends at a distance from the connector part 14 and also at a distance from the torch nozzle 18. A nozzle cap 28 is attached to the mantle tube 24 by means of a cap nut 26, which cap encloses the nozzle-side end of the torch body 12 as well as a major portion of the torch nozzle 18 all around, and has a central exit opening 30, from which the tip of the torch nozzle 18, which tip forms the torch tip 16, projects for a short distance.

The nozzle cap 28 (FIG. 2) has a ceramic basic body that is produced, in one piece, from two ceramic materials. In this regard, an electrode 32 having the shape of a segment of a spherical shell and provided with the exit opening 30 is produced from an electrically conductive first ceramic material, particularly from titanium nitride or from a mixture of titanium nitride and aluminum oxide, while an insulating element 34, attached to the mantle tube 24 by means of the cap nut 26 and connected in one piece with the electrode 32, is produced from an electrically insulating second ceramic material, in the present case from aluminum oxide. A contact element 36, also consisting of the first ceramic material, runs from the electrode 32, by way of an inner surface 38 of the insulating element 34, which surface faces the torch nozzle 18, all the way to a step 42 of the insulating element 34, which step extends perpendicular to the longitudinal torch axis 40, where the element is contacted by means of an electrical connector 44 composed of metal. Alternatively, however, it is also possible to embed the contact element 36 into the insulating element 34, so that it is not exposed to any environmental influences. Then, similar to what is shown in FIG. 2, it can project out of the insulating element 34 at the step 42 and can be bent there to produce the contact with the electrical connector 44. At the other end, it is possible to either embed the contact element 34 into the electrode 32, or, alternatively, to also bend a section that projects out of the insulating element 34, so that the section lies against the electrode 32. This embodiment is particularly advantageous if the contact element 36 is configured as a thin film. A connector cable 46 extends from the connector 44 to an electronic evaluation unit 48 disposed in the mantle tube 24, at its end facing the connector part 14. The electronic evaluation unit 48 has a microprocessor 48a and other active components, such as discriminators, bus drivers, operation amplifiers or varactor diodes, for example, as well as passive electrical components 48b, which, together with the electrode 32 forming the capacitance, form an electrical oscillating circuit, the frequency of which is dependent on the capacitance and thereby on the distance of the electrode 32 from an electrically conductive work piece to be worked on. In this way, the distance from the work piece can be regulated by way of frequency measurement and evaluation by means of the microprocessor 48a.

The components 48a, 48b of the electronic evaluation unit 48 are disposed on at least one circuit board, in each instance, which is in contact with the torch body 12 and thereby is cooled by the gases supplied to the torch nozzle 18 by way of the gas feed lines 20, in general acetylene or propane and oxygen. The passive electrical components 48b, which are less temperature-sensitive than the microprocessor 48a or the active components, are disposed closer to the torch tip 16. The placement of the electronic evaluation unit 48 on the torch body 12 allows a simple connection with a distance regulation device, by means of a standard plug 50, which is disposed on the mantle tube 24 in the exemplary embodiment shown. Furthermore, a sensor 52, which serves for measuring the temperature and/or the structure-born sound in the torch body 12 and thereby detects any flashback at an early point in time and then interrupts the gas feed, which could destroy the cutting torch 10, as well as a high-tension generator 54 that serves for igniting the cutting torch 10 are disposed in the mantle tube 24. In the exemplary embodiment shown, the entire evaluation unit 48 is disposed in the mantle tube 24. However, it is also possible to dispose the microprocessor 48a above the mantle tube 24, on the torch body 12.

In the exemplary embodiment shown, a gap is disposed between the torch nozzle 18 and the electrode 32, in the region of the exit opening 30. However, it is also possible to fill the gap by means of an insulating material, and, in particular, to dispose the insulating element 34 to lie against the torch nozzle 18.

In summary, the following should be stated: The invention relates to a welding or cutting tool 10 for welding or cutting electrically conductive work pieces, having a nozzle 18 disposed at a tool tip 16, for exit of a welding or cutting jet, and having a nozzle cap 28 that encloses the nozzle 18, at least in part, and is open toward the tool tip 16, which cap has an electrode 32 that forms a capacitance with the respective work piece, and which cap has an insulating element 34 that electrically insulates the electrode 32 relative to the further components of the tool. According to the invention, it is provided that the electrode 32 consists of a first, electrically conductive ceramic material, and is configured in one piece with the insulating element 34, which consists of a second, electrically insulating ceramic material.

The invention claimed is:

1. A welding or cutting tool for welding or cutting electrically conductive work pieces, having a nozzle disposed at a tool tip, for exit of a welding or cutting jet, and having a nozzle cap that encloses the nozzle, at least in part, and is open toward the tool tip, wherein the nozzle cap has an electrode that forms a capacitance with the respective work piece, and wherein the nozzle cap has an insulating element, wherein the electrode comprises an electrically conductive first ceramic material, and is configured in one piece with the insulating element, wherein the insulating element comprises an electrically insulating second ceramic material.

2. The tool according to claim 1, wherein the first ceramic material is titanium nitride or a ceramic having titanium nitride.

3. The tool according to claim 1, wherein the second ceramic material is aluminum oxide.

4. The tool according to claim 1, further comprising an electronic evaluation unit having an electrical connector, wherein the nozzle cap has a contact element that connects the electrode with the electrical connector in electrically conductive manner.

5. The tool according to claim 4, wherein the contact element comprises the first ceramic material.

6. The tool according to claim 4, wherein the contact element is configured as a film strip having a thickness of maximally 0.2 mm.

7. The tool according to claim 4, wherein the contact element is embedded into the insulating element.

8. The tool according to claim 4, wherein the contact element extends over a step on the insulating element that runs transverse to a longitudinal tool axis.

9. The tool according to claim 8, wherein the contact element projects from the insulating element at the step, and is bent where the contact element projects at the step to produce planar contact with the step.

10. The tool according to claim 4, wherein the contact element is disposed on an inner surface of the insulating element that faces the nozzle.

11. The tool according to claim 1, wherein the electrode has a spherical outer surface, facing away from the nozzle, wherein the spherical outer surface has a central exit opening.

12. A method for the production of a nozzle cap for the welding or cutting tool according to claim 1, wherein in a two-component ceramic injection-molding method, first material for forming the first ceramic material, which forms the electrode, is introduced into an injection mold in a first method step, and second material for forming the second ceramic material, which forms the insulating element, is introduced into the injection mold in a second method step, and wherein the semi-finished product obtained in this manner is then removed from the injection mold and conducted to a firing process.

13. A method for the production of a nozzle cap for the welding or cutting tool according to claim 1, wherein first material for forming the first ceramic material that forms the electrode is introduced into a first injection mold, and second material for forming the second ceramic material, which forms the insulating element, is introduced into a second injection mold, and wherein the semi-finished products obtained in this manner are removed from the injection molds and joined together in a firing process.

14. The method according to claim 12, wherein the first material for forming the first ceramic material is used to form a contact element and wherein the first material for forming the first ceramic material that forms the contact element is introduced into the respective injection mold before removal of the semi-finished product or of the semi-finished insulating element from the injection mold, in a further method step.

* * * * *